(12) United States Patent
Martucci et al.

(10) Patent No.: US 6,641,884 B1
(45) Date of Patent: Nov. 4, 2003

(54) CORRUGATED HOSE ASSEMBLY

(75) Inventors: Norman S. Martucci, Madison Heights, MI (US); Boney A. Mathew, Clarkston, MI (US)

(73) Assignee: Teleflex Fluid Systems, Madison Heights, MI (US)

( * ) Notice: Subject to any disclaimer, the term of this patent is extended or adjusted under 35 U.S.C. 154(b) by 71 days.

(21) Appl. No.: 09/634,277

(22) Filed: Aug. 9, 2000

(51) Int. Cl.[7] .............. B32B 5/14; B32B 27/28; B32B 27/34; F16L 11/115
(52) U.S. Cl. ............ 428/36.1; 138/137; 138/140; 138/141; 138/DIG. 1; 428/36.91
(58) Field of Search .............. 428/34.5, 34.6, 428/34.7, 435, 475.8, 361, 36.91; 138/137, 140, 141, DIG. 1

(56) References Cited

U.S. PATENT DOCUMENTS

| | | | |
|---|---|---|---|
| 2,991,808 A | 9/1961 | Sigmann | 138/141 |
| 3,864,446 A | 2/1975 | Maroschak | 264/95 |
| 4,104,095 A | 8/1978 | Shaw | 156/83 |
| 4,312,383 A | * 1/1982 | Kleykamp | 138/103 |
| 4,330,017 A | * 5/1982 | Satoh et al. | 138/126 |
| 4,800,109 A | 1/1989 | Washizu | 428/34.9 |
| 5,284,184 A | * 2/1994 | Noone et al. | 138/121 |
| 5,305,799 A | 4/1994 | Dal Palu | 138/109 |
| RE35,527 E | 6/1997 | Martucci | 174/47 |
| 6,192,942 B1 | * 2/2001 | Hsieh et al. | 138/137 |

* cited by examiner

Primary Examiner—Sandra M. Nolan

(57) ABSTRACT

According to the present invention, there is provided a hose assembly with an inner fluoropolymer layer having a smooth inner surface and an outer polyamide layer having an undulated surface.

1 Claim, 2 Drawing Sheets

CORRUGATED HOSE ASSEMBLY

BACKGROUND OF THE INVENTION

1. Field of the Invention

The subject invention relates to a hose construction. More specifically, the subject invention relates to a hose assembly having an inner fluoropolymer layer with a polyamide outer layer used in automotive, aeronautics and other environs for carrying fluids, such as fuels.

2. Description of Related Art

Hose assemblies for conveying fuels are well known in the art. Such assemblies are exposed to a variety of fuel mixtures and fuel additives in addition to extreme engine temperatures. Such hose assemblies must be resistive to chemicals, as well as heat resistant to degradation as a result of chemical and heat exposure.

Fluoropolymer materials, such as polytetrafluoroethylene possess the requisite chemical and temperature resistant properties for most fuel hose applications. However, fluoropolymer materials exhibit relatively poor tensile and hoop strengths. As a consequence, such fluorinated materials are prone to kinking. Such kinking remains permanent and provides a continual resistance to fluid flow through the hose assembly. Moreover, as a result of the fluorinated material low tensile strength, attachment of securing or coupling members to the hose assembly is unreliable.

Various approaches have been described for offering additional strength to a fluoropolymer layer. One approach involves braiding fibers about the inner fluorocarbon layer. The braided fibers offer additional strength for the fluorocarbon layer resulting in a hose assembly that resists kinking. An example of such an approach is disclosed in co-pending U.S. Ser. No. 08/535,734, filed Jun. 11, 1990, and assigned to the assignee of the subject invention. A drawback of such braiding techniques, however, is the extensive labor and time involved.

Additional examples for strengthening an inner fluorocarbon layer with an outer layer are shown in U.S. Pat. No. 2,991,808 to Sigmann, U.S. Pat. No. 4,104,095 to Shaw, and U.S. Pat. No. 4,800,109 to Washizo, all of which disclose the use of a polytetrafluoroethylene inner layer supported with an outer layer.

Alternatively, some patents in the prior art utilize both an outer layer and a braided layer for added strength as shown in U.S. Reissue Pat. No. 35,527. However, there remains problems with the bending capabilities of such tubing in conjunction with the outer layer.

Furthermore, some patents in the prior art utilize multi-layer hoses with corrugated outer surfaces for added strength at the bending sites, as shown in the U.S. Pat. No. 5,305,799, to Holmgren. However, these processes have not been utilized for hoses having an inner fluoropolymer layer and an outer polyamide layer.

Additionally, some patents in the prior art utilize machines for creating corrugation, as shown in the U.S. Pat. No. 3,864,446, to Maroschak. However, there remains problems in creating corrugation without having to corrugate the entire hose assembly.

It would therefore be useful to develop a hose which is resistant to kinking when being bent without adding extensive labor or time to the manufacturing process.

SUMMARY OF THE INVENTION

According to the present invention, there is provided a hose assembly with an inner fluoropolymer layer having a smooth inner surface and an outer polyamide layer having an undulated surface. A method is provided for making a hose assembly by forming a smooth inner fluoropolymer layer without undulations and an outer polyamide layer having undulations.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
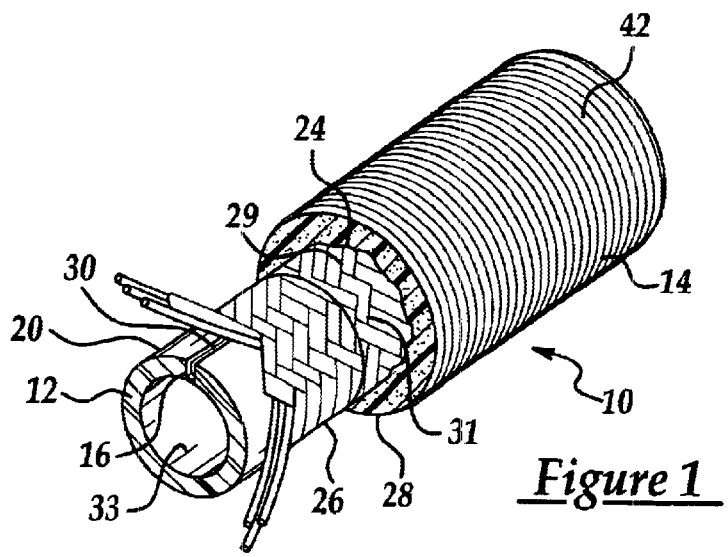
FIG. 1 is a prospective view partially broken away and in cross section of the preferred embodiment of the subject invention.
Figure 2:
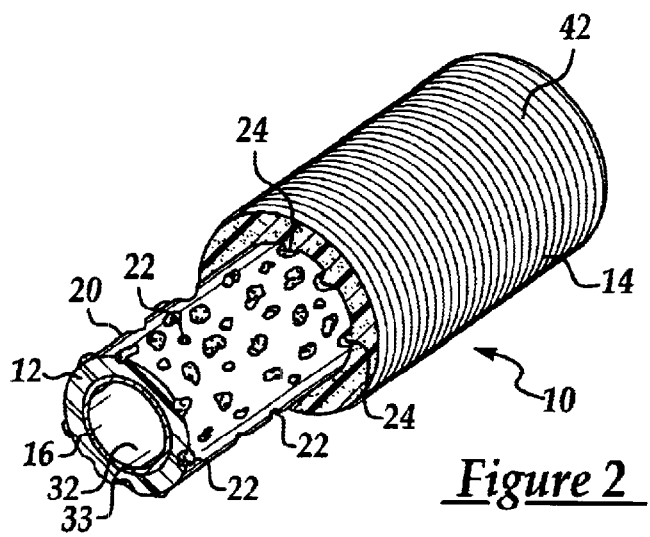
FIG. 2 is a prospective view partially broken away and in cross section of an alternate embodiment of the subject invention.
Figure 3:
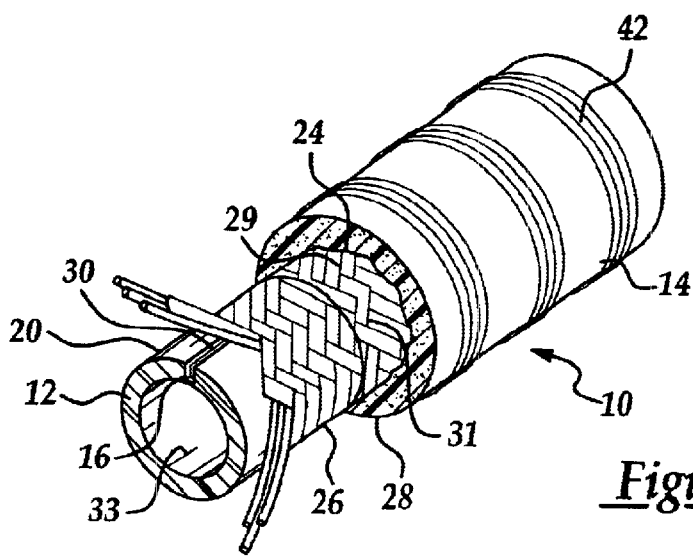
FIG. 3 is a prospective view partially broken away and in cross section of an alternate embodiment of the subject invention.

A hose assembly made In accordance with the present invention is generally shown at 10 and FIGS. 1, 2, and 3. The assembly 10 includes a tubular inner layer 12 that is entirely smooth and non-corrugated. An outer layer 14 is disposed about the inner layer 12. An integral conductive strip 16 is co-extensive with the length of the inner layer 12. A coupling mechanism 18 (FIG. 4) to engages the end of the hose assembly 10. The outer surface of the outer layer 14 induces undulations or corrugations 42.

The tubular inner layer 12, as best shown in FIGS. 1, 2, and 3, is made from a fluoropolymer material resistant to both chemical and heat degradation, allowing a variety of fluids, particularly automotive fuels and fuel additives, e.g., detergents, alcohols, etc., to pass through the inner layer 12 without corroding or degrading the inner layer 12. The inner layer 12 is preferably extruded using well-known melt or paste extrusion techniques and has a wall thickness of between 0.001 and 0.120 inches. The inner layer 12 induces an inner surface wherein it is entirely smooth and without corrugations as shown in FIG. 1.

Although the inner layer 12 may be made of any number of fluoropolymer materials, the inner layer 12 is ideally made from a polymer of the following: polytetrafluoroethylene (PTFE), the homopolymer of tetrafluoroethylene sold under the trademark TEFLON by DuPont; perfluorinated ethylene-propylene (FEP), the copolymer of tetrafluoroethylene and hexafluoropropylene sold under the trademark TEFLON FEP by DuPont; perfluoroalkoxy fluorocarbon resin (PFA), the copolymer of tetrafluoroethylene-perfluorovinyl ethyl, sold under the trademark TEFLON PFA by DuPont; or ethylene tetrafluoroethylene (ETFE), the copolymer of ethylene and tetrafluoroethylene sold under the trademark TEF-ZEL by DuPont PVDF and THV. In addition to the aforementioned fluoropolymer materials, polychlorotrifluoroethylene, the homopolymer of chlorotrifluoroethylene, and polychlorotrifluoroethylene-ethylene, the copolymer of chlorotrifluoroethylene and ethylene may also be used.

The outer layer 14, best shown in FIGS. 1, 2, and 3, is disposed about the inner layer 12. The outer layer 14 is made up of polyamide material for increasing strength of the hose assembly 10. More specifically, the outer layer 14 allows the inner layer 12 to bend without kinking. That is, the outer layer 14 provides strength to the inner layer 12 upon bending. This is commonly referred to as hoop strength. Thus, by disposing the outer layer 14 having undulations 42 about the inner layer 12, the hoop strength of the inner layer 12 is increased. Further, the outer layer 14 adds to the working pressure of the hose. That is, the outer layer 14 provides strength to the inner layer 12 and allows the inner layer 12 to accommodate a fluid under pressure. Additionally, the outer layer 14 adds to the tensile strength of the hose assembly 10. When coupling members 18 (FIG. 6) are disposed at the ends of the hose assembly 10, as described below, the outer layer 14 increases the tensile strength of the hose assembly 10 sufficient to fixedly connect the coupling member 18 (FIG. 4) to the hose assembly 10. By disposing the outer layer 14 having undulations 42 about the inner layer 12, the bend radius of the hose is increased.

Although the outer layer 14 may be made of any number of polyamide materials, preferably the outer layer 14 is made from a polyamide material selected from the following: nylon 6; nylon 6,6; nylon 11; or nylon 12; or other nylon alloy. It should be noted that the selection of a particular polyamide material should be based upon the physical requirements of the particular hose assembly application. For example, nylon 6 and nylon 6,6 offer higher heat resistant properties than nylon 11 or nylon 12, whereas nylon 11 and nylon 12 offer better chemical resistant properties than nylon 6 or nylon 6,6. Thus, the ultimate selection of a polyamide material should be based upon requirements of a particular hose assembly application.

In addition to those polyamide materials previously mentioned, other nylon materials such as: nylon 6,12; nylon 6,9; nylon 4; nylon 4,2; nylon 4,6; nylon 7; and nylon 8 may also be used. Ring containing polyamides including aliphatic-aromatic polyamides e.g. nylon 6,T and nylon 6,I may also be used. Finally, the outer layer 14 may also be made of various polyamide blends. Again, it is noted that the selection of particular polyamide material is dependent upon the specific physical requirements of a particular hose assembly.

The outer layer 14 can be made of an expanded polyamide material, as shown in FIGS. 1, 2, and 3. Alternatively, the outer layer 14 can include an unexpanded polyamide material. Although expanded and unexpanded polyamide outer layers 14 both offer the hose assembly 10 increased tube and tensile strength, the expanded polyamide is preferred. The expanded polyamide material offers the hose assembly 10 substantially the same degree of strength as the unexpanded material while significantly reducing the weight of the hose assembly 10. That is, the expanded polyamide material is significantly lighter in weight than the unexpanded polyamide material due to the presence of void spaces therein formed during the expansion process. The expansion process, commonly known in the art as "foaming", generally takes place while extruding the outer layer 14.

Such foaming processes generally require blowing agents such as "CELOGEN HT 550™", or exothermic blowing agent sold by Uniroyal Chemicals or "ACTIVEX 537™", or other endothermic blowing agent sold by B.I. Chemicals. The blowing agent is generally intermixed with a polyamide material during the extrusion of the outer layer 14 and causes expansion of the polyamide by producing gas, thereby forming void spaces within the outer layer 14.

The undulations or corrugations 42 on the outer layer 14, provide additional bend radius to the hose assembly 10.

There are two specific types of undulations or corrugations that may be present on the outer layer 14, there types are spiral (FIG. 2) or circular (FIG. 3) undulation. Further, the entire hose assembly 10 or portions thereof may be corrugated. This allows the manufacturer to undulate or corrugate only those portions which will be bent thereby only providing this additional support where necessary.

There are a number of methods for fabricating the hose assembly 10, one particular well known method involves a two part extrusion process typically known as "cross-head" extrusion. The typical "cross-head" extrusion method involves first extruding an inner layer, such as the fluoropolymer inner layer 12, then extruding an outer layer thereover, such as the polyamide or outer layer 14. This method of fabrication is particularly effective when utilizing an inner layer 12 comprising polytetrafluoroethylene. Additionally, when utilizing thermoplastic fluoropolymer materials, co-extrusion methods of fabricating may be applicable. As commonly known in the art, co-extrusion methods involving utilizing two extruders at once thereby forming both inner and outer layers simultaneously.

After the hose assembly has been formed, the hose is sent through a molding machine. The molding machine is made up of pairs of presses 44 which form the corrugation or undulation on the outer surface of the outer layer 14. The mold presses 44 are configured to form undulations on the opposite sides of the hose 10 thus creating the undulations about the entire outer surface of the outer layer 14. This allows the manufacturer to either undulate or corrugate the entire hose 10 or only portions thereof. Additionally, the presses 44 are slidably attached to the molding machine thus allowing the presses 44 to be moved thus enabling the manufacturer to determine what part of the tubing will be undulated. Also, there are two specific types of undulation that may be present on the outer layer 14, these types are spiral (FIG. 2) or circular (FIG. 3) undulation. The type of undulations 42 depend upon the configuration of the mold presses 44 or pressure forming the outside with internal mandrels or cross head extrusion with an internal mandrel with pressure forming dies outside. Due to the chemical inertness and general lubricious nature of fluoropolymer materials, relative movement between the inner 12 and outer 14 layers is often encountered. In hose applications which require immobility between adjacent layers, the present hose assembly 10 may be modified to eliminate such relative movement between the inner 12 and outer 14 layers.

Figure 4:
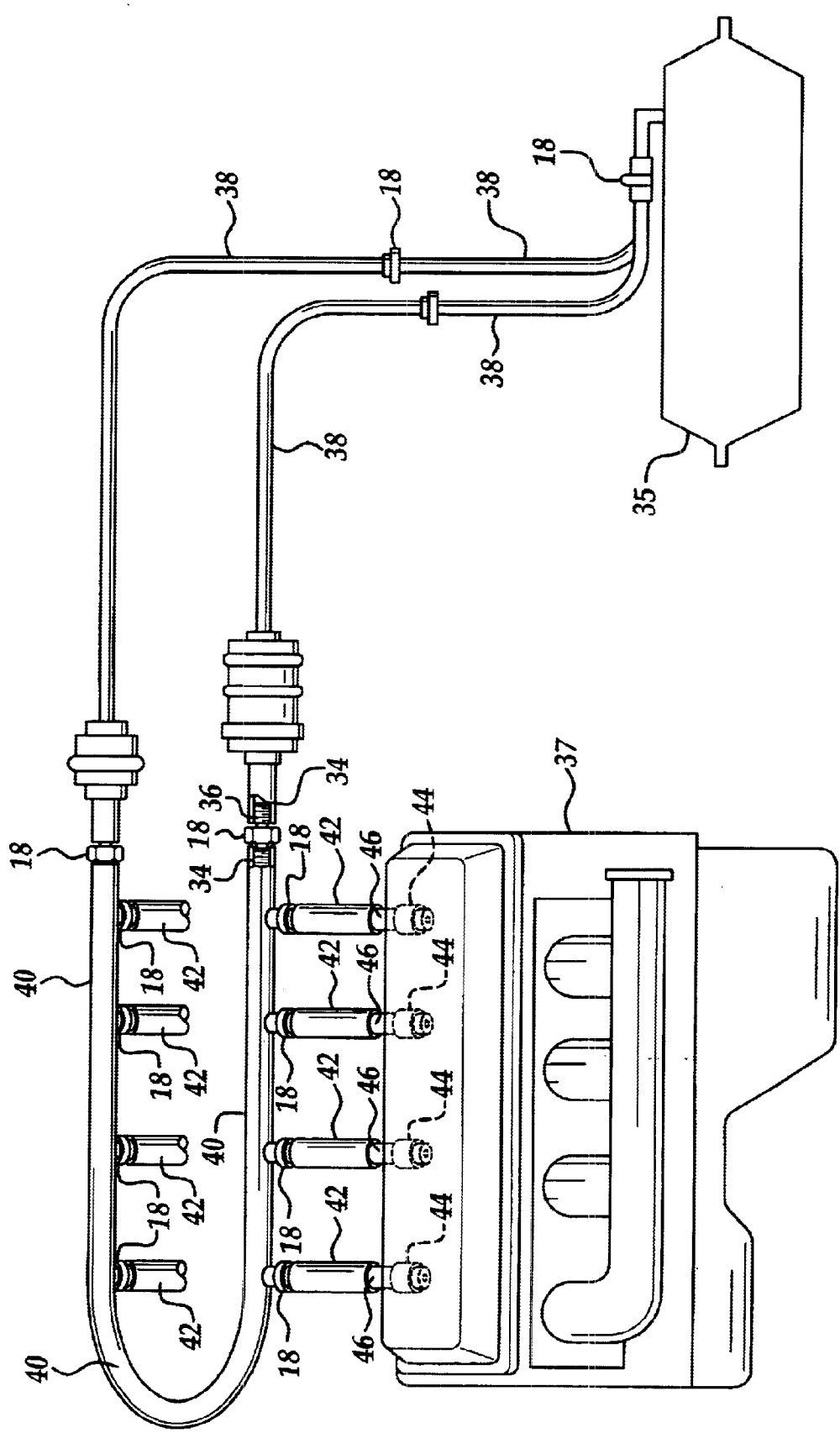
FIG. 4 is a schematic view, of a fuel system showing three separate applications of the subject invention.

One embodiment for eliminating relative movement between the inner 12 and outer 14 layers involves etching an outer surface 20 of the inner layer 12 prior to disposing the outer layer 14 thereabouts, as shown on FIG. 4. Etching techniques are well known in the art and examples of common etching techniques include acid treatment, plasma treatment, and mechanical scuffing and adhesive. Subsequent to etching, the outer surface 20 of the inner layer 12 maintains an irregular configuration 22 as shown in FIG. 4. Essentially, the irregular configuration 22 includes of rough surface having a plurality of cavities and protuberances therein.

Subsequent to etching the outer surface 20 of the inner layer 12, the outer layer 14 is extruded thereover. During this extrusion, an inner surface 24 of the outer layer 14 shapes into mating engagement with the irregular configuration 22 of the outer surface 20 of the inner layer 12, thereby resulting in a mechanical and/or chemical bond therebetween. This mechanical bond prohibits relative movement (rotational or longitudinal) between the inner 12 and outer 14 layers.

An alternative embodiment for eliminating relative movement between the inner 12 and outer 14 layer is shown on FIG. 1. The alternative embodiment includes disposing of at least one braided layer between the inner 12 and outer 14 layers. More specifically, the alternative embodiment includes a braided or woven layer 26 disposed in an interweaving fashion, or wrapped tightly about the outer surface 20 of the inner layer 12. Preferably, the material used for the braided layer 26 is a glass fiber. Glass fibers are preferred due to relative low cost and superior heat resistant properties.

The braided or woven fibers can be tightly wound or they may be loosely wound about the inner layer 12, having wide gaps between adjacent fibers. Subsequent to position of the braided layer 26 about the inner layer 12, the outer layer is extruded thereover. During this extrusion, the inner surface 24 of the outer layer 14 shapes into mating engagement with the irregular configuration 31 of the intermediate coating 28 thereby resulting in mechanical and/or the chemical bond therebetween, the chemical bond only occurring when there are gaps between the braid. This mechanical bond prohibits relative movement (rotational and longitudinal) between a braided layer 26/intermediate coating 28 and outer layer 14.

Additionally, as fluid flows to the inner layer 12, electrical charges tend to build throughout the length of inner layer 12. In order to prevent these electrical charges from accumulating, the inner layer 12 preferably includes an integral, longitudinal conductive strip 16 co-extensive with the length of the inner layer 12 for conducting electrical charge along the length of the inner layer 12. Preferably the inner integral conductive strip 16 includes of conductive strip 30 of carbon black, as shown in FIG. 1. Alternatively, the integral conductive strip 16 may include an inner layer 32 of carbon black positioned adjacent an inner surface 33 of the inner layer 12 as shown in FIGS. 2 and 3. Alternatively, the integral conductive strip 16 may be interspersed throughout the inner layer 12 by intermixing carbon black throughout the fluoropolymer material while the inner layer 12 is extruded. The braided layer 26, intermediate coating 28, and outer layer 14 are all preferably electrically nonconductive. This is important in that electrical charges applied to the exterior of the hose assembly 10 will not be conducted along its length nor to the fluid passing therethrough. It will be appreciative that the integral conductive strip may include conductive material other than carbon black.

The assembly 10 further includes a coupling mechanism 18 as shown in FIG. 4. The coupling mechanism 18 is adapted to engage the ends of the hose assembly 10 for interconnecting the hose assembly 10 to a flow of fluid, e.g. fluid flow 2 and from a fuel tank 35. More particularly, the coupling mechanism 18 includes a coupler 18 or joint having an insert portion 34 for inserting into and engaging the inner surface 33 (FIGS. 1 and 2) of the inner layer 12. The insert portion 34 may have a plurality of barbs 36 for engaging the inner surface 33 (FIGS. 1 and 2) of the inner layer 12, as thus viewed in FIG. 4. The coupling mechanism 18 may also include an engaging portion extending longitudinally from the insert portion 34 for engaging a fitting. The engaging portion may include a male threaded member or a female threaded member. The engaging portion may include any configuration that will cooperate with the member to which it is to be connected with. For example, the engaging portion can include a socket to receive a mating ball joint. Alternatively, in place of the engaging portion, the coupling mechanism 18 can provide an additional insert portion 34 for inserting into the interior surface of the inner layer 12 of another hose assembly 10 as shown in FIG. 4.

Thus, the coupling mechanism 18 can operate as a joint between independent hose assemblies 10 thereby interconnecting them to allow fluid flow therebetween. The coupling mechanism 18 is preferably made from organic polymeric material and mechanically connected to the hose assembly 10, as shown in FIG. 4. Alternatively, the coupling mechanism 18 can be molded to the hose assembly.

A typical application of the present hose assembly 10 is shown in FIG. 4. FIG. 4 discloses an engine 37, fuel tank 33, and three distinct uses of the present hose assembly 10. A fuel line for conveying fuel between a fuel rail 40 and the fuel tank 35 is shown at 38. Coupling mechanism 18 as previously described, interconnects the fuel line 38 with the fuel rail 40 fuel tank 35. The fuel rail 40 provides a flow of fuel to a plurality of fuel jumpers 42. Although not shown in FIG. 4, it will be appreciated to those skilled in the art that a gas manifold and throttle body can be substituted for the fuel tail 43. The fuel jumpers 42 are interconnected to the fuel rail 40 by ways of the coupling mechanism 18, as shown in FIG. 4, or alternatively, it may be molded directly to the fuel rail 40. Fuel injections for injecting fuel into individual fuel cylinders are shown on phantom at 44. The fuel injectors 44 may include male supports 46 for inserting and engaging the inner surface of the fuel jumper 42, in a similar manner as the insert portion 34 of the coupling mechanism 18 engages the inner surface 33 of the inner layer 12.

Although the diameters of the fuel line 38, fuel rail 40, and fuel jumper 42 may differ, all are made from the hose assembly 10 as described above. That is, each includes a fluoropolymer inner layer 12 and a polyamide outer layer 14 having undulations 42. Due to possible variances in diameter along each hose assembly 10, i.e., fuel line 38, fuel rail 40, fuel jumper 42 and fuel filler pipes, it will be understood that the insert portion 34 of the coupling mechanism 18 used to interconnect each hose assembly 10 must vary correspondingly to accommodate each specific hose assembly 10 diameter.

Although the present hose assembly has been described for conveying fuels, it will be readily appreciated that the present hose assembly 10 may be used for conveying a variety of fluids, e.g., cooling fluids, lubricating fluids, etc.

Throughout this application, various publications, including United States patents, are referenced by citation or number. All citations for these publications are listed below. The disclosure of these publications and patents in their entireties are hereby incorporated by reference into the application in order to more fully describe the state of the art to which this invention pertains.

The invention has been described in an illustrative manner, and it is to be understood that the terminology which has been used is intended to be in the nature of words of description, rather than of limitation.

Obviously, many modifications and variations of the present invention are possible in light of the above teachings. It is, therefore, to be understood that within the scope of the appended claims, the invention may be practiced otherwise than is specifically described.

What is claimed is:

1. A hose assembly comprising:

an inner fluoropolymer layer having an entirely smooth non-corrugated inner surface;

an outer polyamide layer extruded about said inner layer, said outer layer having a corrugated outer surface, said hose assembly being used in a fuel line; and at least one braided layer disposed on said outer layer.

* * * * *